(12) United States Patent
Liu

(10) Patent No.: US 6,392,529 B1
(45) Date of Patent: May 21, 2002

(54) CARBON FIBER CONTACTOR HAVING AN ELASTOMER TO REDUCE HYSTERESIS

(75) Inventor: Shengli Liu, Elkhart, IN (US)

(73) Assignee: CTS Corporation, Elkhart, IN (US)

( * ) Notice: Subject to any disclaimer, the term of this patent is extended or adjusted under 35 U.S.C. 154(b) by 33 days.

(21) Appl. No.: 09/616,398

(22) Filed: Jul. 14, 2000

Related U.S. Application Data

(63) Continuation-in-part of application No. 09/137,261, filed on Aug. 20, 1998.

(51) Int. Cl.[7] .............................................. H01C 10/30
(52) U.S. Cl. ........................ 338/202; 338/118; 338/160
(58) Field of Search ................................. 338/160, 162, 338/202, 176, 171, 118

(56) References Cited

U.S. PATENT DOCUMENTS

| | | | | |
|---|---|---|---|---|
| 2,040,278 A | * | 5/1936 | Siegel | 338/174 |
| 3,102,990 A | * | 9/1963 | Miller et al. | 338/162 |
| 3,597,720 A | * | 8/1971 | Burgess | 338/202 |
| 3,886,386 A | * | 5/1975 | Hillig | 310/251 |
| 4,336,565 A | * | 6/1982 | Murray et al. | 361/225 |
| 4,568,876 A | * | 2/1986 | Maisch | 324/714 |
| 5,139,862 A | * | 8/1992 | Swift et al. | 428/299.1 |
| 5,177,529 A | * | 1/1993 | Schroll et al. | 399/125 |
| 5,725,707 A | * | 3/1998 | Koon et al. | 156/157 |
| 5,843,567 A | * | 12/1998 | Swift et al. | 428/221 |
| 6,140,907 A | * | 10/2000 | Liu | 338/160 |

FOREIGN PATENT DOCUMENTS

DE 4442617 * 6/1996 .................. 338/202

* cited by examiner

*Primary Examiner*—Karl D. Easthom
(74) *Attorney, Agent, or Firm*—Mark P. Bourgeois; Mark W. Borgman

(57) ABSTRACT

An electrical contactor or wiper that uses an elastomer near the tip to reduce flexing and improve electrical signal accuracy. The contactor includes an elongated beam having a U-shaped end. Several carbon fibers form a bundle attached to the beam. The fibers have ends and tips. The ends are compressively held inside the U-shaped end and the tips emanate from the U-shaped end. An elastomer is disposed over the carbon fibers where they emanate from the U-shaped end. The elastomer reduces flexing of the carbon fibers. The elastomer is located between the beam and adjacent to the tips with the tips being exposed. A laser is used to trim the carbon fibers and elastomer to form the tips.

18 Claims, 2 Drawing Sheets

US 6,392,529 B1

CARBON FIBER CONTACTOR HAVING AN ELASTOMER TO REDUCE HYSTERESIS

CROSS REFERENCE TO RELATED AND CO-PENDING APPLICATIONS

This application is a continuation in part of U.S. patent application Ser. No. 09/137,261, filed Aug. 20, 1988 and entitled, "Carbon Fiber Contacting Position Sensor". This application is related to U.S. patent application Ser. No. 09/405,548, filed Sep. 24, 1999 and entitled, "Carbon Fiber Wiper". The applications having a common assignee and a common inventor. The contents of which are specifically incorporated by reference in their entirety.

BACKGROUND OF THE INVENTION

1. Field of the Invention

This invention relates to electrical contactors. In particular, there is a carbon fiber contactor that uses an elastomer near the tip to reduce flexing.

2. Description of the Related Art

Various devices and methods of dealing with the design of position sensors are legion. More specifically, contacting position sensors have been formed from a contactor tip and a resistive element. The tip moves over the surface of the element and causes an output resistance reading to change. Polymer resistive position sensors are a variable resistor type of electrical devices with a voltage output that converts the linear or angular displacement to an electrical signal. The contactors are conductive moving elements in the sensors that control the voltage output by sliding over a polymer resistive element. These contactors represent a unique type of sliding electrical contacts. They are miniature in design and size. The contactor is typically an alloy of platinum, silver, palladium and gold. The current density is low at approximately 10 A/sqin. or less. They run at slow sliding speeds around 50 fpm or slower. The contactor should be capable of making good electrical contact under all the application environments, basically, heat and cold, dry and humid, dust, vibration, and etc as other types of contacts do. However, the reliability and noise performance requirements are more crucial than with other types of sliding contacts. The contactor must also have good corrosion resistance.

Currently, the contactors of this type are constructed with metallic materials or alloys, because they are good conductors, easy to process and readily available. Noble alloys such as gold, palladium and platinum alloys are often used because of their non-tarnishing character in all the common air pollutants. These noble alloy contactors have been used for decades, and have been well accepted in the industry. Because of their industry-wide importance the American Society for Testing and Materials has adopted numerous standards for these alloys, as shown in ASTM Standards Vol. 03.04.

As the contactor tip moves against the element surface wear occurs on both surfaces. The prior art contactor tips are formed from a metal having good wear resistance and spring characteristics, for example beryllium copper. The prior art resistive elements have been formed from carbon and polymer combinations that are screened onto a substrate and dried.

PROBLEM WITH THE RELATED ART

There are several common problems occurring with the prior art. As the metal contactor tip moves against the element over time, it can gouge and pit the element causing the resistance reading to fail or to generate an erroneous resistance reading. Another problem with the prior art devices is that over time the element material can be removed from the element and build up as a loose layer over the surface of the element. When the contactor tip is moved it skates across the surface of the loose material instead of making electrical contact with the element. This causes the resistance reading from the element to appear as an open circuit with infinite resistance and essentially causes the sensor to be inoperative for a period of time until contact is reestablished by the contactor tip to the element.

Poor electrical contacts have often been found associated with the metal contactors, even with noble alloy contactors. As a result, electrical noise is generated from these contactors, which lowers the performance and reliability, and ultimately causes failure of the sensor devices. Excessive wear either from the contactor itself or from the polymer resistive elements has also often been found in this type of sensors, which reduces the durability and even causes premature failure of the sensor devices.

Prior art contacting position sensor designers have attempted to solve these problems by introducing a lubricant into the contactor tip/element interface. A typical lubricant is an emulsification of Teflon particles. The lubricant reduces the frictional forces between the wear surface while still allowing electrical contact to be made between the contactor tip and the resistive element. The liquid lubricant is applied to the contact surfaces to reduce the wear. However, most of the liquid lubricants are poor electrical conductors, thereby causing relatively high electrical resistance across contact surfaces and possible failure of the devices where lubricants have been used improperly. The viscosity of the liquid lubricant changes significantly over the application temperature range, resulting in poor contact at low temperatures and insufficient lubrication at high temperatures. There are several other problems that arise from using a lubricant in the contactor system. First, the amount of lubricant applied is critical to the performance of the system. If too little lubricant is applied, the system will have excessive wear. If too much is applied, erroneous resistance readings due to skating will occur. It is very difficult to repeatably apply a uniform layer of the lubricant. Second, using a lubricant adds additional cost in material and labor to the overall sensor cost. Therefore, there is a need for a less expensive sensor unit that can eliminate the use of lubricants and has improved wear characteristics.

Several designs of Carbon fiber contactors are shown in U.S. patent application Ser. No. 09/137,261, filed Aug. 20, 1998 and entitled, "Carbon Fiber Contacting Position Sensor". The contents of which are specifically incorporated by reference in their entirety. While the invention of the foregoing patent application does an admirable job in improving wear resistance and eliminating the need for a lubricant, it has been found that the fibers under some pressure and motion conditions may flex excessively causing what is known as hysteresis. Hysteresis is defined as the percentage error introduced by the contactor as measured by the electrical signal versus the actual position of the contactor. The present invention is directed toward solving this problem.

SUMMARY OF THE INVENTION

It is a feature of the invention to provide an electrical contactor. The contactor includes an elongated beam having a U-shaped end. Several carbon fibers form a bundle attached to the beam. The fibers have ends and tips. The ends are compressively held inside the U-shaped end and the tips emanate from the U-shaped end. An elastomer is disposed over the carbon fibers where they emanate from the U-shaped end. The elastomer reduces flexing of the carbon fibers. More specifically, the elastomer is located between the beam and adjacent to the tips with the tips being exposed.

The invention resides not in any one of these features per se, but rather in the particular combination of all of them herein disclosed and claimed. Those skilled in the art will appreciate that the conception, upon which this disclosure is based, may readily be utilized as a basis for the designing of other structures, methods and systems for carrying out the several purposes of the present invention.

Figure 1:
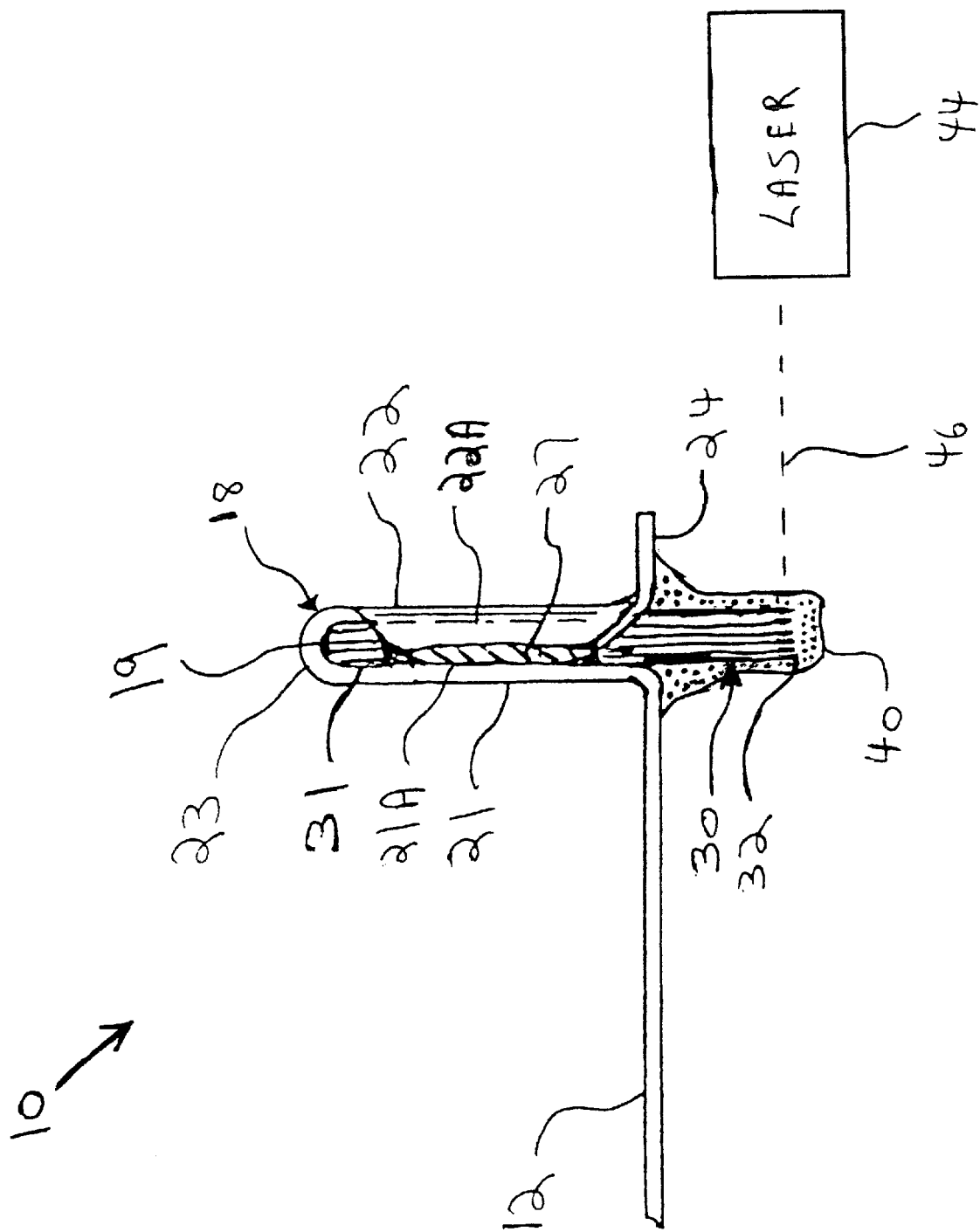
FIG. 1 is a side view of a carbon fiber contactor having an elastomer applied over the carbon fibers

It is noted that the drawings of the invention are not to scale. The drawings are intended to depict only typical embodiments of the invention, and therefore should not be considered as limiting the scope of the invention. In the drawings, like numbering represents like elements between the drawings.

DETAILED DESCRIPTION OF THE PREFERRED EMBODIMENT

Figure 2:
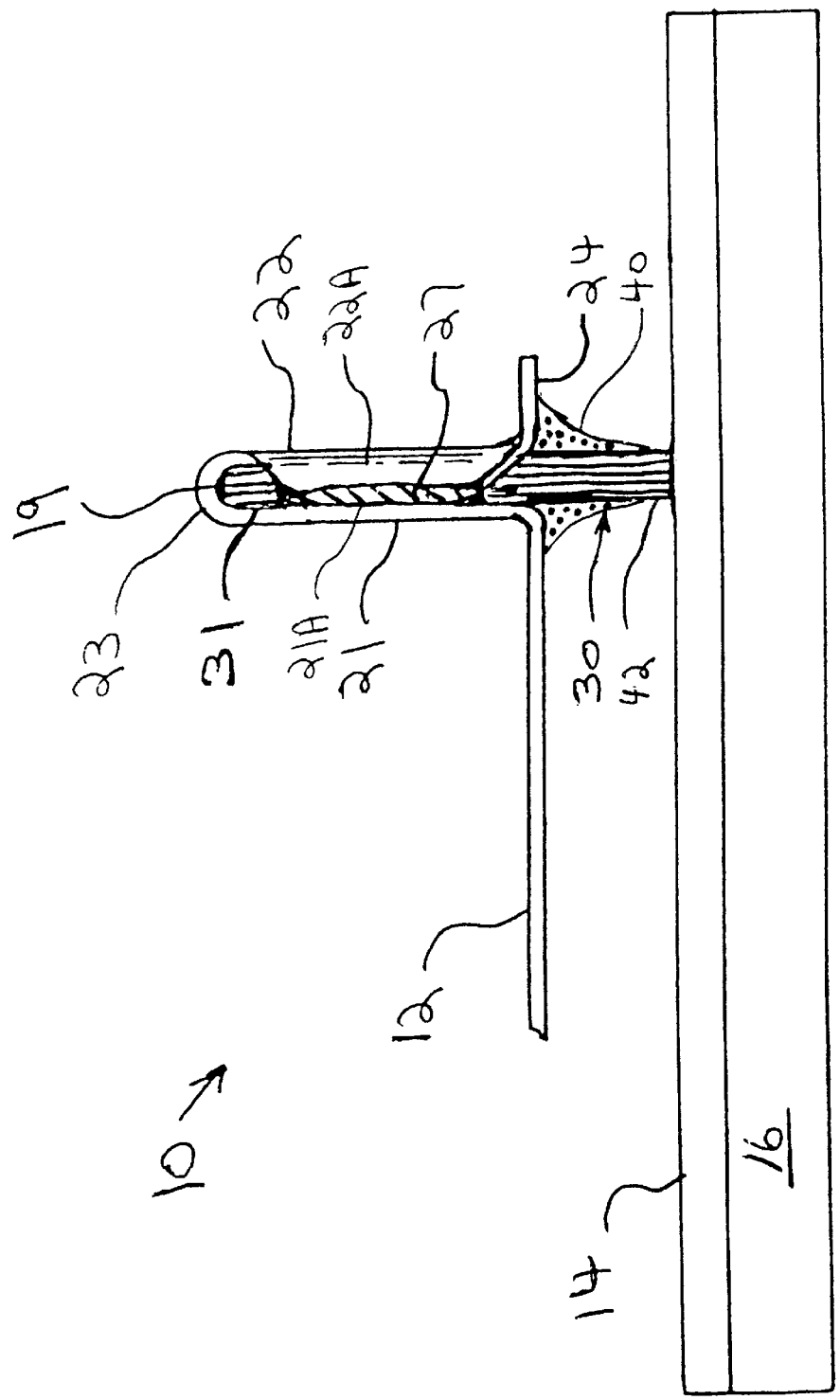
FIG. 2 is a side view of the carbon fibers after laser trimming and in contact with a resistor.

Referring to FIGS. 1 and 2, a carbon fiber contactor assembly with an elastomeric covering 10 is shown. An elongated metal beam 12 has a U-shaped end 18 with a channel 19 therein. The U-shaped end 18 is made up of a pair of flanges 21 and 22 extending from the beam and a connecting flange 23. Flange 21 is attached to beam 12. Flange 22 is parallel and opposed to flange 21. A lip 24 is attached to flange 22 and extends away from flange 22. Lip 24 makes flange 22 more rigid and prevents excessive flexing that could lead to loosening of the fibers. Several conductive fibers 30 such as carbon fibers are held together in a bundle at a proxil end 31 in channel 19 by crimping and welding. The carbon fibers extend from the channel 19 to a distal end 32. Other conductive fibers such as silicon carbide could be used instead of carbon fibers. An edge 22A of flange 22 is bent over and contacts flange 21 on edge 21A where it is held with a weld 27 such as a spot weld or laser weld. If desired, edge 21A could be bent over or both edge 21A and edge 22A could be bent together. The metal beam is preferably formed from a non-ferrous spring metal such as brass or beryllium copper. The beam and channel can be formed by stamping or by chemical etching. The carbon fibers are 10 micron diameter carbon fibers, fiber type P55, commercially available from Amoco Corporation, Chicago, Ill.

An elastomer 40 is shown covering distal end 32 of the carbon fibers. An elastomer is a synthetic thermosetting polymer having the ability to be streched to at least twice its original length and to retract very rapidly to approximately the original length when released. Elastomer 40 is a silicone elastomer such as TSE-322B commercially available from GE Silicones or S-7001 commercially available from Emerson and Cummings. After the elastomer is applied and cured, it is necessary to laser trim the distal end 32 in order to form a tip 42. A conventional laser 44 such as a YAG laser is used to generate a laser beam 46 which is used to form tip 42 by removing the elastomer covering the tip and trimming the carbon fibers to a uniform length.

Referring to FIG. 2, tip 42 is shown in electrical contact with a resistive element 14. Resistive element 14 rests on and is supported by a flexible film or substrate 16. During operation tip 42 moves over the resistive element 14 which has an applied voltage causing the voltage reading to change and an electrical signal to pass through the beam 12, carbon fibers 30 and resistive element 14. In a typical position sensor application, a pair of electrically connected contactor assemblies 10 are used along with a pair of resistive elements 14 that are electrically connected. The path of the electrical circuit is as follows, a position dependent voltage from resistive element 14 is communicated through tip 42, carbon fibers 30, beam 12, other beam 12, other carbon fibers 30, other carbon fiber tip 42 and through other resistive element 14 which is connected to the output of the sensor.

It has been found that the fibers under some pressure and motion conditions may flex excessively causing what is known as hysteresis. Hysteresis is defined as the percentage error introduced by the contactor as measured by the electrical signal versus the actual position of the contactor. The elastomer 40 reduces the amount of flexing of tip 42 and as such reduces the amount of hysteresis. Samples of carbon fiber contactors produced without the elastomer showed hysteresis of 0.8%. Samples of carbon fiber contactors produced with the elastomer showed hysteresis ranging from 0.15% to 0.35%. This high level of accuracy is needed in automotive position sensing applications such as throttle control.

The following process steps are used to assemble the contactor assembly 10:
1. Placing the beam 12 into a fixture to hold the beam.
2. Inserting the fibers 30 into channel 19.
3. Crimping flanges 21 or 22 or both to hold the fibers in channel 19.
4. Spot welding the flanges together
5. Applying the elastomer over the carbon fibers 30 through a tube adjacent the fibers.
6. Using an air knife to remove the excess elastomer.
7. Curing the elastomer in a high humidity environment of about 1 hour.
8. Laser trimming distal end 32 to form tip 42 using a 5 watt YAG laser for 2–4 passes at 0.1 to 10 mm/sec.

VARIATIONS OF THE PREFERRED EMBODIMENT

Although the illustrated embodiment discusses laser trimming to form tip 42, it is contemplated to form tip 42 by polishing with a diamond wheel rotating at 120 RPM with 6 micron diamond grit.

While the invention has been taught with specific reference to these embodiments, someone skilled in the art will recognize that changes can be made in form and detail without departing from the spirit and the scope of the invention. The described embodiments are to be considered in all respects only as illustrative and not restrictive. The scope of the invention is, therefore, indicated by the appended claims rather than by the description. All changes that come within the meaning and range of equivalency of the claims are to be embraced within their scope.

What is claimed is:

1. An electrical contactor, comprising:
   a) an elongated beam having a U-shaped end;
   b) a plurality of conductive fibers forming a bundle attached to the beam, the fibers having a plurality of first ends and a plurality of tips;

c) the first ends compressively held inside the U-shaped end and the tips emanating therefrom; and d) an elastomer disposed over the conductive fibers where they emanate from the U-shaped end, the elastomer operable to reduce flexing of the conductive fibers.

2. The electrical contactor, according to claim 1, wherein the elastomer is located between the beam and adjacent to the tips, the tips being exposed.

3. The electrical contactor, according to claim 2, wherein the U-shaped end forms a channel therein.

4. The electrical contactor, according to claim 3, wherein the U-shaped end is formed by a pair of flanges connected to and extending from the beam and a connecting flange attached between the pair of flanges.

5. The electrical contactor, according to claim 4, wherein a lip is attached to one of the flanges and extends therefrom, the lip preventing excessive flexing of the contactor.

6. The electrical contactor, according to claim 5, wherein at least one edge of one of the flanges is crimped in adjacent contact with another edge of the other flange.

7. The electrical contactor, according to claim 6, wherein a weld affixes the edges together.

8. The electrical contactor, according to claim 7, wherein the weld is a spot weld.

9. The electrical contactor, according to claim 7, wherein the weld is a laser weld.

10. The electrical contactor, according to claim 1, wherein the conductive fiber is a carbon fiber.

11. An electrical contactor, comprising:

a) an elongated beam having a first flange connected to and extending from the beam and a second flange parallel and opposed to the first flange;

b) a connecting flange attached between the first and second flanges;

c) a channel formed by the flanges;

d) a plurality of conductive fibers forming a bundle disposed in the channel, the fibers having a plurality of first ends and a plurality of tips;

e) the first ends compressively held between the first and second flanges inside the channel and the tips emanating from the channel; and f) an elastomer disposed over the carbon fibers where they emanate from the channel, the elastomer operable to reduce flexing of the conductive fibers.

12. The electrical contactor, according to claim 11, wherein the elastomer is located between the beam and adjacent to the tips, the tips being exposed.

13. The electrical contactor, according to claim 11, wherein a lip is attached to the second flange and extends therefrom, the lip preventing excessive flexing of the contactor.

14. The electrical contactor, according to claim 11, wherein at least one edge of the first or second flanges is crimped in adjacent contact with another edge of the other flange.

15. The electrical contactor, according to claim 14, wherein a weld affixes the edges together.

16. The electrical contactor, according to claim 15, wherein the weld is a spot weld.

17. The electrical contactor, according to claim 16, wherein the weld is a laser weld.

18. The electrical contactor, according to claim 11, wherein the conductive fiber is a carbon fiber.

* * * * *